United States Patent [19]

Henigue

[11] Patent Number: 4,819,961
[45] Date of Patent: Apr. 11, 1989

[54] DEVICE FOR ADJUSTING THE ANGULAR POSITION OF A STEERING WHEEL ON A MOTOR VEHICLE STEERING COLUMN AND STEERING WHEEL PROVIDED WITH SAID DEVICE

[75] Inventor: Christian Henigue, Delle, France

[73] Assignee: Ecia Equipements et Composants pour L'Industrie Automobile, Audincourt, France

[21] Appl. No.: 154,410

[22] Filed: Feb. 10, 1988

[30] Foreign Application Priority Data

Feb. 11, 1987 [FR] France ............... 87 01720

[51] Int. Cl.$^4$ ........................... B62D 1/18
[52] U.S. Cl. ........................... 280/775; 74/492; 280/279; 403/4
[58] Field of Search ............... 280/274, 279, 280, 775; 74/489, 492, 574; 403/4

[56] References Cited

U.S. PATENT DOCUMENTS

| 2,819,777 | 1/1958 | Kosch | 74/492 |
| 3,641,834 | 2/1972 | Barenyi | 74/492 |
| 4,068,858 | 1/1978 | Harrison et al. | 280/279 |
| 4,445,703 | 5/1984 | Tange | 280/279 |

FOREIGN PATENT DOCUMENTS

| 507602 | 9/1920 | France . |
| 577157 | 9/1924 | France . |
| 997670 | 1/1952 | France . |
| 2224016 | 10/1974 | France . |

Primary Examiner—Kenneth R. Rice
Attorney, Agent, or Firm—Sughrue, Mion, Zinn, Macpeak, and Seas

[57] ABSTRACT

Device for a steering wheel having a hub (2) with an axial bore (3) having a portion (4) defining a frustoconical surface adapted to cooperate with a portion (5) of the column (1) of complementary shape and first splines (6) arranged angularly in accordance with a given pitch. A screw (7) is provided for clamping the hub (2) to the column (1). The column is in the form of a tube in which is disposed an intermediate member (8) including a portion (9) defining a frustoconical surface adapted to cooperate with a portion (10) of the inner surface of the column having a complementary shape and second splines (13) adapted to cooperate with the first splines (6) forming splines of the hub (2) for preventing rotation between the hub and the intermediate member. The screw (7) clamps the hub (2) and the intermediate member (8) in such manner as to jam the column (1) between the hub and the intermediate member (8) and thus lock the steering wheel in the desired position of adjustment of the steering wheel on the column.

9 Claims, 1 Drawing Sheet

DEVICE FOR ADJUSTING THE ANGULAR POSITION OF A STEERING WHEEL ON A MOTOR VEHICLE STEERING COLUMN AND STEERING WHEEL PROVIDED WITH SAID DEVICE

The present invention relates to a device for adjusting the angular position of a steering wheel on a motor vehicle steering column and a steering wheel provided with said device.

As is well-known, this type of steering wheel usually comprises a circular part and a hub conventionally interconnected by a number of radial arms.

The keying of the steering wheel to ensure that it rotates with the free end of the steering column is usually achieved by means of splines provided in the steering column in which corresponding splines of the hub are engaged. The hub further comprises a frustoconical surface adapted to cooperate with a surface of complementary shape on the steering column to ensure a good transmission of the forces between these two parts. The steering wheel and the steering column are axially fixed together by a nut, for example a lock nut screwed on the end of the steering column and bearing against a washer interposed between the nut and the hub.

The steering wheel is mounted on the steering column after various adjustments of the front steering set of wheels of the vehicle have been effected. Now, this front set of wheels is adjusted after the steering bar and the steering column associated therewith have been placed in position, which results in a repercussion of the adjustments on the steering column which rotates to a varying extent about its axis. Consequently, it will be understood that the splines provided on the steering column are not in the majority of cases angularly positioned to permit the mounting of the steering wheel in such manner that the branches of the latter have a precise position related to the driving and the viewing of the apparatus placed on the dashboard of the vehicle through this steering wheel.

Moreover, operations for adjusting the steering after the steering wheel has been placed in position may offset the latter relative to the initial adjustment.

In order to overcome these drawbacks, it has been proposed to multiply the number of splines. The steering wheel is usually angularly keyed on the steering column by 40 splines and the uncertainty of the position of the steering wheel is therefore 9°.

A device is also known from the document FR No. 2,557,992 for adjusting the angular position of an element keyed on a shaft for rotation with the latter, in particular a motor vehicle steering wheel associated with a steering column. This device comprises a ring having on its inner surface means for coupling the ring with a shaft, for example constituted by a steering shaft and on its outer surface means for coupling the shaft with an element such as a steering wheel hub. This ring is movable in translation by means of a control element, at least one of the coupling means is adapted to determine, in addition to the translation of the ring, an angular displacement of the hub and therefore the steering wheel relative to the steering shaft.

Furthermore, a device is known from the document FR No. 997,670 for keying steering wheels having two branches. In this device, which provides a compensation, by a correct keying, for the differences of orientation which might occur when mounting a steering wheel having two branches on a motor vehicle steering shaft, there is interposed between the steering wheel hub and the steering shaft an intermediate ring whose outer shape, which is similar to the inner shape of the hub, permits the keying of the steering wheel on the steering shaft in the desired position.

In a particular embodiment, the hub of the steering wheel includes an inner cone which is extended by an upper cylindrical bore provided with longitudinal grooves or splines and is engaged on a suitable intermediate ring having a lower cone and a grooved cylindrical head keyed on the steering shaft, the locking of the nut of the steering shaft finally ensuring the position of the steering wheel by interpenetration of the grooves or splines of the hub and of the intermediate ring.

Lastly, the documents AT No. 295,246, GB No. 509,508, DE No. 900,505, U.S. Pat. Nos. 1,922,596 and 1,903,162 disclose a number of special coupling devices.

However, the structures of all these devices have a number of drawbacks, in particular owing to their relatively complex constructions which correspondingly increase the cost price of such devices.

An object of the invention is therefore to solve the problems mentioned hereinbefore by providing an adjusting device which is simple, reliable, permits rapidly and easily effecting the desired adjustment and is of relatively low cost price.

The invention therefore provides a device for adjusting the angular position of a steering wheel on a motor vehicle steering column, in which the steering wheel comprises a hub provided with an axial bore having a portion defining a frustoconical surface adapted to cooperate with a portion of complementary shape of the column, and first means forming splines arranged angularly in accordance with a given pitch, means being provided for clamping the hub on the column, wherein said column is in the form of a tube in which is disposed an intermediate member comprising a portion defining a frustoconical surface adapted to cooperate with a portion having a complementary shape on the inner surface of the column and complementary means adapted to cooperate with said first means forming splines of the hub for locking the hub and intermediate member in rotation, and the clamping means are constituted by means for clamping the hub and the intermediate member in such manner as to jam the column between the hub and the intermediate member and thus lock the steering wheel in the desired adjusted position of the steering wheel on the column.

In another aspect, the invention also provides a steering wheel provided with such an adjusting device.

A better understanding of the invention will be had from the following description which is given solely by way of example with reference to the accompanying drawings, in which.

Figure 1:
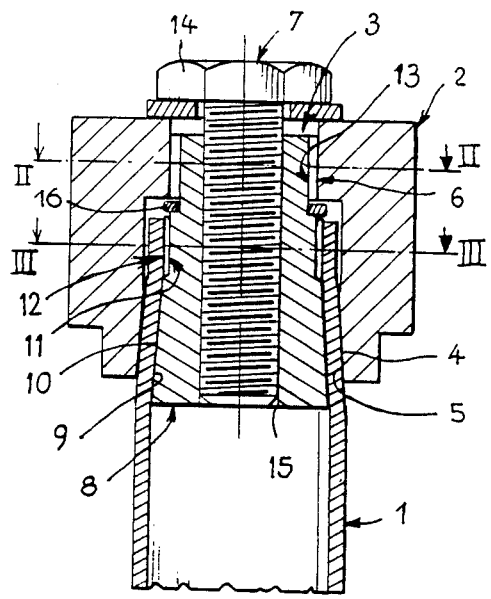
FIG. 1 is a sectional view of a first embodiment of an adjusting device according to the invention.

As can be seen in FIG. 1, a motor vehicle steering wheel whose angular position must be adjusted on a steering column 1, comprises a hub 2 provided with an axial bore 3 having a portion defining a frustoconical surface 4 adapted to cooperate with a portion 5 of the column 1 which has a complementary shape, and first means 6 forming splines, angularly arranged according to a given pitch. Means 7 are also provided for clamping the hub on the steering column so as to fix the hub in position on this column.

The steering column 1 is in the form of a tube in which is disposed an intermediate member 8 including a portion having a frustoconical surface 9 adapted to cooperate with a portion 10 of complementary shape on the inner surface of the column and second means 11 forming splines adapted to engage with an angular clearance in the complementary means 12 provided on a portion having a corresponding inner surface of the column 1. This intermediate member 8 also includes complementary means 13 adapted to cooperate with the first means 6 forming splines of the hub 2 for interconnecting them in rotation.

The clamping means 7 of the hub on the column are formed by clamping means of the hub 2 and the intermediate member 8 so as to jam the column between the hub and the intermediate member and thus fix the steering wheel in the desired position of adjustment of the latter on the column.

As will be understood hereinafter, the second means 11 forming splines and the complementary means 12 constitute means for limiting the angular displacement of the intermediate member relative to the column in the case of the release of the clamping means 7.

Advantageously, these clamping means 7 comprise a screw 14 cooperating with a tapped hole 15 in the intermediate member and bearing against the hub 2 of the steering wheel.

Furthermore, the device further comprises means 16 for locking the axial position of the intermediate member in the column. These means are advantageously formed by a resiliently yieldable ring mounted on the intermediate member and bearing against the edge of the steering column for locking the latter in position.

Figure 2:
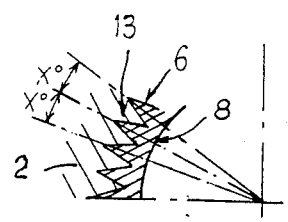
FIGS. 2 and 3 are sectional views of means forming splines and being part of a device according to the invention, these sections being taken on lines II—II and III—III of FIG. 1.
Figure 3:
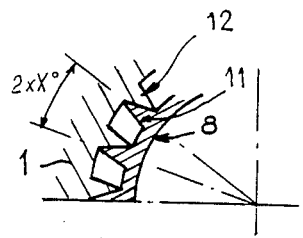

As can be seen more particularly in FIGS. 2 and 3, the angular clearance between the second means 11 forming splines and the complementary means 12 is for example at the most equal to the pitch X of the first means 6 forming splines so as to allow, when the user desires to adjust the angular position of the steering wheel, an angular displacement of the intermediate member in the column to permit the adjustment while limiting this displacement in the event of for example an accidental releasing of the clamping means 7.

Thus, when a user desires to adjust the position of the steering wheel, he unscrews the screw 14, which enables him to place the steering wheel in a desired position, by driving the intermediate member and then retightens this screw for relocking the device.

If the steering wheel is offset to an extent larger than the taking up value allowed by the clearance between the second means forming splines and the corresponding complementary means, the user then completely unscrews the screw 14 to permit withdrawing the steering wheel and putting it back into a roughly correct position on the intermediate member, the final adjustment being carried out in the manner described hereinbefore.

Figure 4:
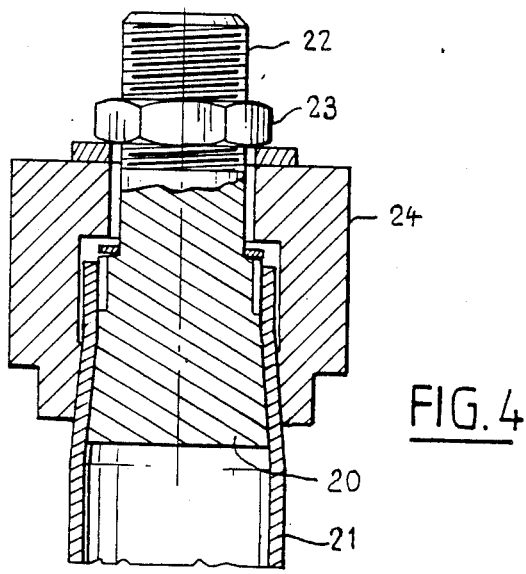
FIG. 4 is a sectional view of a second embodiment of an adjusting device according to the invention.

In another embodiment shown in FIG. 4, the intermediate member 20 disposed within the steering column 21 includes a screw-threaded portion 22 on which is screwed a nut 23 bearing against a hub 24 of a steering wheel so as to lock the latter on this column.

It will be understood that other embodiments, in particular of the means for limiting the angular displacement of the intermediate member relative to the steering column, may be envisaged.

I claim:

1. A device for adjusting the angular position of a steering wheel on a motor vehicle steering column, said device comprising a steering column in the form of a tube defining a frustoconical outer surface and a frustoconical inner surface, a hub provided on the steering wheel and defining an axial bore which has a portion defining a frustoconical surface complementary to said frustoconical outer surface of the tube, first means provided in the bore and forming splines disposed angularly in accordance with a given pitch, an intermediate member comprising a portion defining a frustoconical surface cooperative with said frustoconical inner surface of the tube, and second means cooperative with said first means forming splines for locking the hub and the intermediate member in rotation and means for clamping the hub to the tube and including means for clamping the hub and the intermediate member in such manner as to jam the tube between the hub and the intermediate member and thus permit a locking of the steering wheel in the desired position of adjustment of the steering wheel on the tube.

2. A device according to claim 1, comprising means for limiting angular displacement of the intermediate member relative to the tube.

3. A device according to claim 2, wherein said limiting means comprise third means forming splines provided on a portion of the intermediate member and means complementary to said third means and engageable with said third means with an angular clearance allowing a limited angular displacement of the steering wheel relative to said tube.

4. A device according to claim 3, wherein said angular clearance is at the most equal to the pitch of said splines of said first means forming splines.

5. A device according to claim 1, wherein said clamping means comprise a tapped hole in the intermediate member and a screw cooperative with said tapped hole and bearing against the hub of the steering wheel.

6. A device according to claim 1, wherein said clamping means comprise a screw-threaded portion of the intermediate member and a nut screwed on the screw-threaded portion of the intermediate member and in bearing relation to the hub.

7. A device according to claim 1, comprising means for locking the intermediate member axially in position in the tube.

8. A device according to claim 7, wherein the locking means comprise a resiliently yieldable ring mounted on the intermediate member and bearing against an edge of the tube for locking the intermediate member in position in the tube.

9. A steering wheel in combination with a device for the position of the steering wheel on a steering column, said device comprising a steering column in the form of a tube defining a frustoconical outer surface and a frustoconical inner surface, a hub provided on the steering wheel and defining an axial bore which has a portion defining a frustoconical surface complementary to said frustoconical outer surface of the tube, first means provided in the bore and forming splines disposed angularly in accordance with a given pitch, an intermediate member comprising a portion defining a frustoconical surface cooperative with said frustoconical inner surface of the tube and second means cooperative with said first means forming splines for locking the hub and the intermediate member in rotation and means for clamping the hub to the tube and including means for clamping the hub and the intermediate member in such manner as to jam the tube between the hub and the intermediate member and thus permit a locking of the steering wheel in the desired position of adjustment of the steering wheel on the tube.

* * * * *